(12) United States Patent
Takayanagi et al.

(10) Patent No.: US 9,488,781 B2
(45) Date of Patent: Nov. 8, 2016

(54) OPTICAL FIBER HOLDER AND OPTICAL FIBER FUSION-CONNECTING DEVICE

(75) Inventors: Hiroshi Takayanagi, Yokohama (JP); Ryuichiro Sato, Yokohama (JP); Yasuhiro Sakamoto, Yokohama (JP)

(73) Assignee: SEI OPTIFRONTIER CO., LTD., Kanagawa (JP)

(*) Notice: Subject to any disclaimer, the term of this patent is extended or adjusted under 35 U.S.C. 154(b) by 728 days.

(21) Appl. No.: 13/885,242

(22) PCT Filed: Dec. 14, 2011

(86) PCT No.: PCT/JP2011/078851
§ 371 (c)(1),
(2), (4) Date: May 14, 2013

(87) PCT Pub. No.: WO2012/090706
PCT Pub. Date: Jul. 5, 2012

(65) Prior Publication Data
US 2013/0236146 A1 Sep. 12, 2013

(30) Foreign Application Priority Data
Dec. 27, 2010 (JP) .................................. 2010-290777

(51) Int. Cl.
*G02B 6/00* (2006.01)
*G02B 6/255* (2006.01)
*G02B 6/36* (2006.01)

(52) U.S. Cl.
CPC ............ *G02B 6/2553* (2013.01); *G02B 6/2555* (2013.01); *G02B 6/3616* (2013.01)

(58) Field of Classification Search
CPC . G02B 6/3616; G02B 6/2553; G02B 6/2555
See application file for complete search history.

(56) References Cited

U.S. PATENT DOCUMENTS

| | | | | |
|---|---|---|---|---|
| 6,668,128 B2* | 12/2003 | Hattori | ................... | G02B 6/245 385/134 |
| 2003/0059193 A1* | 3/2003 | Haruki | ................. | G02B 6/3803 385/137 |
| 2008/0282522 A1* | 11/2008 | Song | ..................... | G02B 6/245 29/33.52 |
| 2010/0260458 A1* | 10/2010 | Sato | ..................... | G02B 6/2555 385/96 |

FOREIGN PATENT DOCUMENTS

| | | |
|---|---|---|
| JP | 3-018505 U | 2/1991 |
| JP | 11-030727 A | 2/1999 |

(Continued)

OTHER PUBLICATIONS

Extended European Search Report of the corresponding European Application No. 11854054.1, dated May 26, 2014.

(Continued)

*Primary Examiner* — Hemang Sanghavi
(74) *Attorney, Agent, or Firm* — Global IP Counselors, LLP

(57) ABSTRACT

An optical fiber fusion splicer includes optical fiber holders that hold optical fibers. Each optical fiber holder includes a base, a cover, and a connecting portion. The base includes a setting table on which an optical fiber F is placed so as to be oriented in the longitudinal direction of the base. The cover has pressing members that press the optical fiber F placed on the setting table against the setting table. The connecting portion joins the cover to the base such that the cover is openable away from and closeable over the base and movable in the longitudinal direction of the base.

8 Claims, 5 Drawing Sheets

(56) References Cited

FOREIGN PATENT DOCUMENTS

| JP | 2005-331580 A | 12/2005 |
|----|---------------|---------|
| JP | 2008-292523 A | 12/2008 |
| JP | 2009-020289 A | 1/2009 |
| JP | 2010-249967 A | 11/2010 |

OTHER PUBLICATIONS

Written Opinion of the International Searching Authority of the corresponding PCT Application No. PCT/JP2011/078851, dated Feb. 7, 2012.

* cited by examiner

OPTICAL FIBER HOLDER AND OPTICAL FIBER FUSION-CONNECTING DEVICE

CROSS-REFERENCE TO RELATED APPLICATIONS

This U.S. National stage application claims priority under 35 U.S.C. §119(a) to Japanese Patent Application No. 2010-290777, filed in Japan on Dec. 27, 2010, the entire contents of which are hereby incorporated herein by reference.

TECHNICAL FIELD

The present invention relates to an optical fiber holder that holds an optical fiber and an optical fiber fusion splicer including the optical fiber holder.

BACKGROUND ART

Japanese Patent Application Publication No. 2008-292523 describes a fusion splicer that includes a grasping structure that grasps a loose buffer optical fiber formed by loosely inserting an optical-fiber strand into a tube. The grasping structure grasps a loose buffer optical fiber by elastically pressing a tube portion of the loose buffer optical fiber placed on a holder base against the holder base.

However, when the tube of the loose buffer optical fiber has a predetermined hardness or higher, the existing grasping structure fails to grasp and fix in place the optical-fiber strand inserted into the tube even by elastically pressing the tube portion against the holder base. In view of this situation, in order to grasp and fix in place an optical-fiber strand, the optical-fiber strand, not the tube portion, has to be directly grasped.

Generally, the ratio of the length of a bare fiber protruding from the optical-fiber strand to the length of an optical-fiber strand protruding from a tube or a coating of an optical fiber buffer differs between a loose buffer optical fiber and a tight buffer optical fiber. More specifically, the ratio of the exposed bare fiber to the exposed optical fiber strand is larger in a tight buffer optical fiber than in a loose buffer optical fiber. Therefore, if an existing grasping structure configured such that the optical-fiber strand of a loose buffer optical fiber is directly grasped is used for a tight buffer optical fiber, the grasping structure would grasp the bare fiber, thereby making it more likely to damage the bare fiber.

SUMMARY OF INVENTION

Technical Problem

An object of the present invention is to provide an optical fiber holder that can hold optical fibers while bare fibers are prevented from being damaged even when the optical fibers have different ratios of an exposed bare fiber to an exposed optical fiber strand and to provide an optical fiber fusion splicer including the optical fiber holder.

Solution to Problem

In order to achieve the above object, the present invention provides an optical fiber holder that holds an optical fiber. The optical fiber holder includes a base including a setting table on which the optical fiber is placed so as to be oriented in a predetermined direction; a cover including a pressing member that presses the optical fiber placed on the setting table against the setting table; and a connecting portion that joins the base and the cover together. The connecting portion joins the cover to the base such that the cover is openable away from and closeable over the base and movable in the predetermined direction.

In the optical fiber holder according to the present invention, preferably, the cover is movable in the predetermined direction only when the cover is in a state of having been opened away from the base such that a back face of the cover has become substantially parallel to the setting table. Preferably, the base includes a plurality of guides protruding from the setting table, the guides allowing the optical fiber to be positioned thereon so as to be oriented in the predetermined direction. Preferably, the connecting portion includes a rotating shaft disposed parallel to the predetermined direction, a tube-shaped portion integrated with the base and into which the rotating shaft is inserted, a shaft holder integrated with the cover and holding the rotating shaft, and a protrusion protruding from the base and the shaft holder has a notch so as not to interfere with the protrusion when the cover is in the state of having been opened away from the base such that the back face of the cover has become substantially parallel to the setting table.

According to another aspect of the present invention, the present invention also provides an optical fiber fusion splicer including a pair of optical fiber holders each according to the present invention, the optical fiber holders being disposed so as to face each other; and a splicing portion that splices the optical fibers held by the optical fiber holders together.

Advantageous Effects of Invention

According to the present invention, even when optical fibers have different ratios of the exposed bare fiber to the exposed optical fiber strand, the optical fibers can be held while bare fibers are prevented from being damaged.

DESCRIPTION OF EMBODIMENTS

Figure 1:
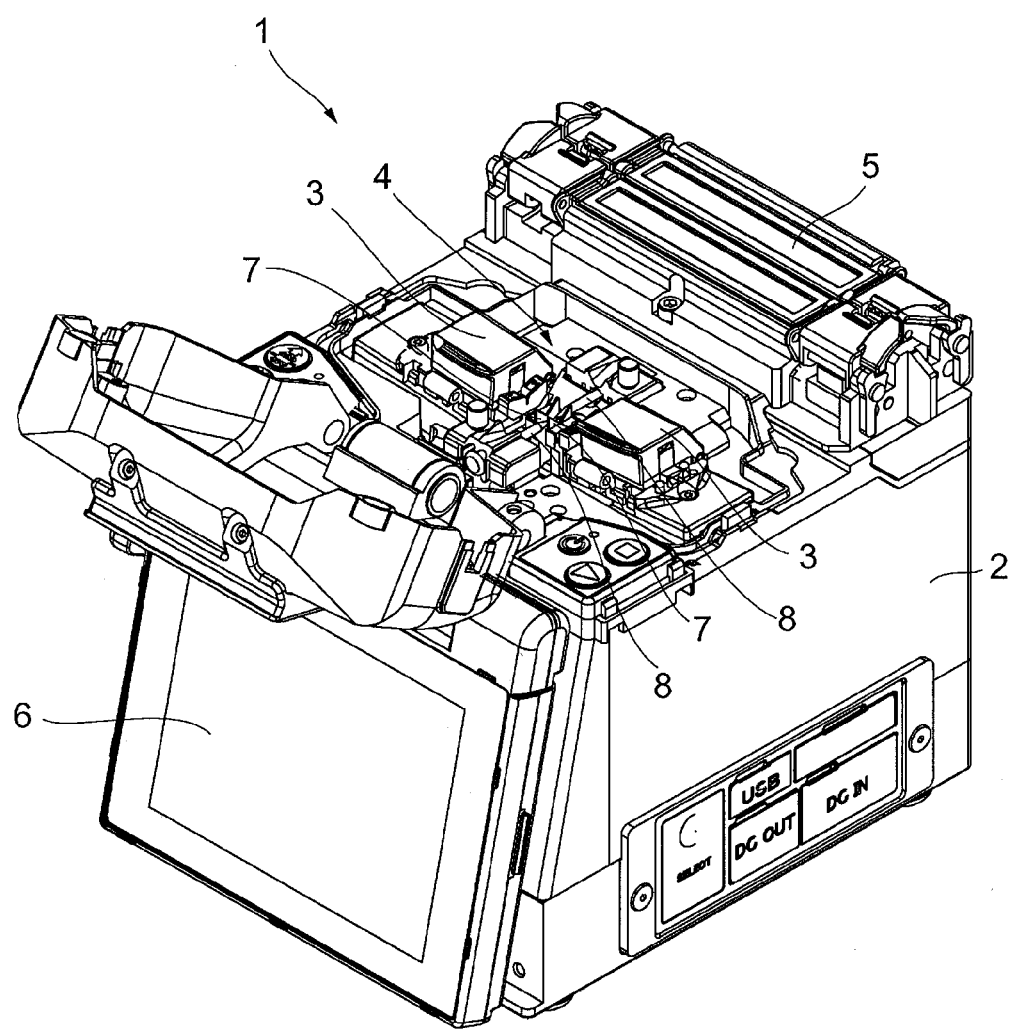
FIG. 1 is a perspective view of an optical fiber fusion splicer according to an embodiment of the present invention.

Referring to the drawings, an embodiment of the present invention is described below. The drawings are provided for the illustration purpose and not for limiting the scope of the invention. The identical reference numerals denote the same parts throughout the drawings in order to avoid redundant description. Not all ratios between dimensions in the drawings are exact.

FIG. 1 is a perspective view of an optical fiber fusion splicer 1 according to an embodiment of the present invention. The optical fiber fusion splicer 1 includes a box-like housing 2. A pair of optical fiber holders 3, a splicing portion 4, and optical-fiber reinforcement heaters 5 are disposed on an upper portion of the housing 2. The optical fiber holders 3 are disposed so as to face each other and hold optical fibers to be spliced together. The splicing portion 4 splices the optical fibers held by the optical fiber holders 3 together. The optical-fiber reinforcement heaters 5 heat a fiber reinforcement sleeve that covers a fusion-spliced portion of the optical fibers and cause the fiber reinforcement sleeve to contract. The optical fiber fusion splicer 1 also includes a monitor 6, which displays the state of fusion splicing of the optical fibers imaged by a camera (not illustrated) disposed inside the housing 2.

The splicing portion 4 includes a pair of fiber positioning members 7, each of which allows a distal end portion of the optical fiber held by a corresponding one of the optical fiber holders 3 to be positioned thereon. These fiber positioning members 7 are disposed between the pair of optical fiber holders 3. The splicing portion 4 also includes a pair of arc electrodes 12 used to splice distal end portions of optical fibers together by an arc discharge. The arc electrodes 8 are disposed between the pair of fiber positioning members 7.

Figure 2:
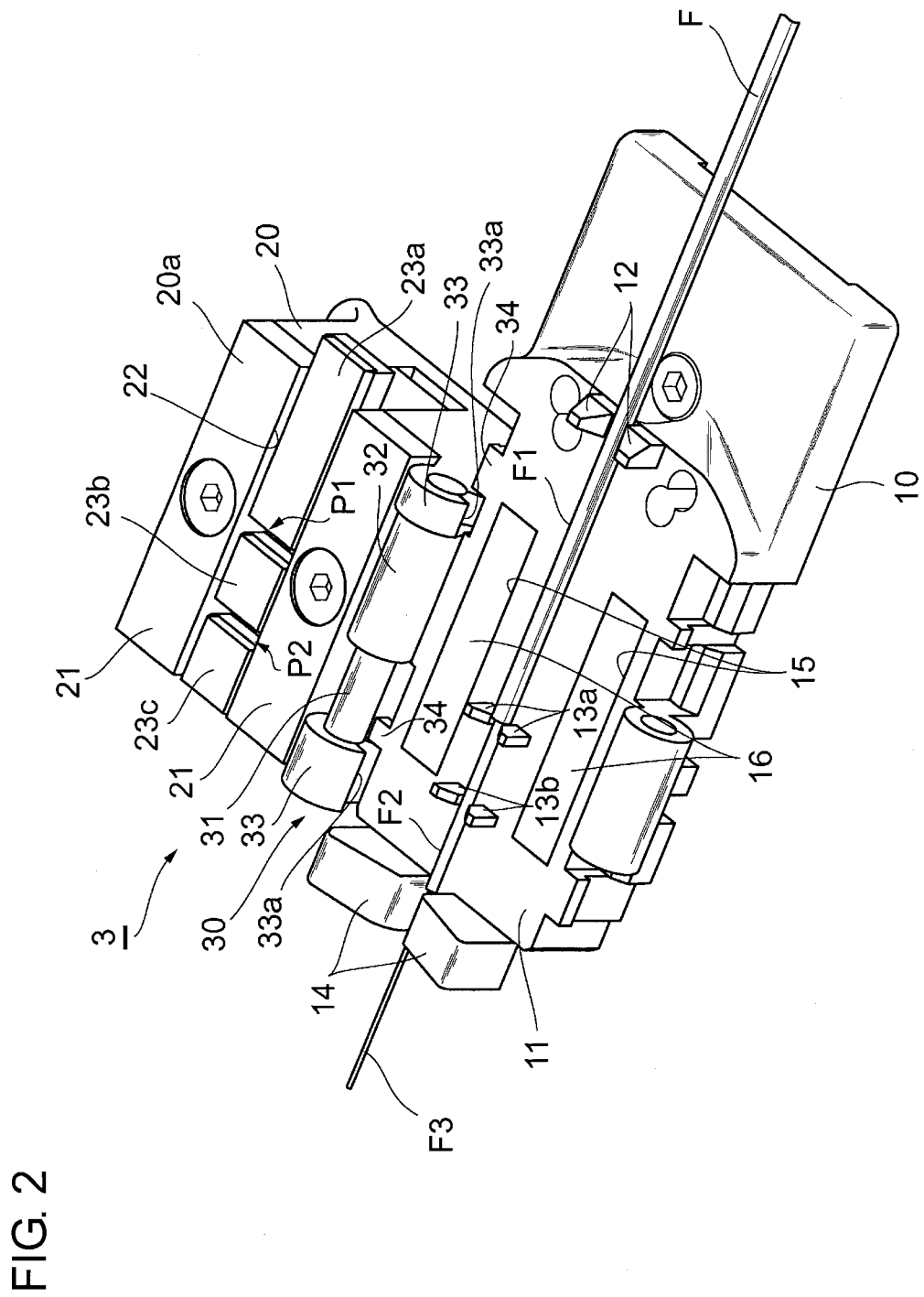
FIG. 2 is a perspective view of an optical fiber holder included in the optical fiber fusion splicer illustrated in FIG. 1 while the optical fiber holder is in an open state.
Figure 3:
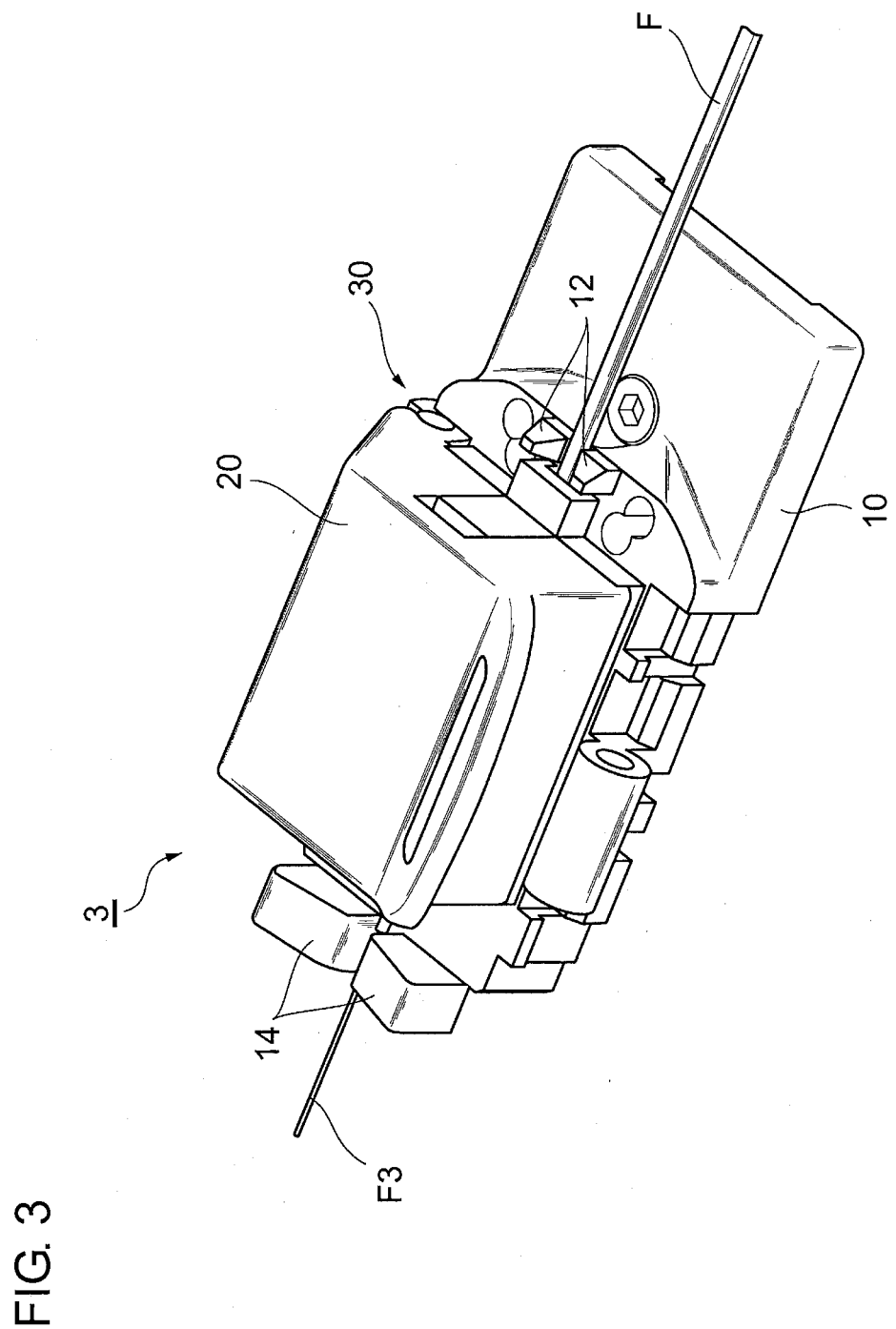
FIG. 3 is a perspective view of the optical fiber holder included in the optical fiber fusion splicer illustrated in FIG. 1 while the optical fiber holder is in a closed state.
Figure 4:
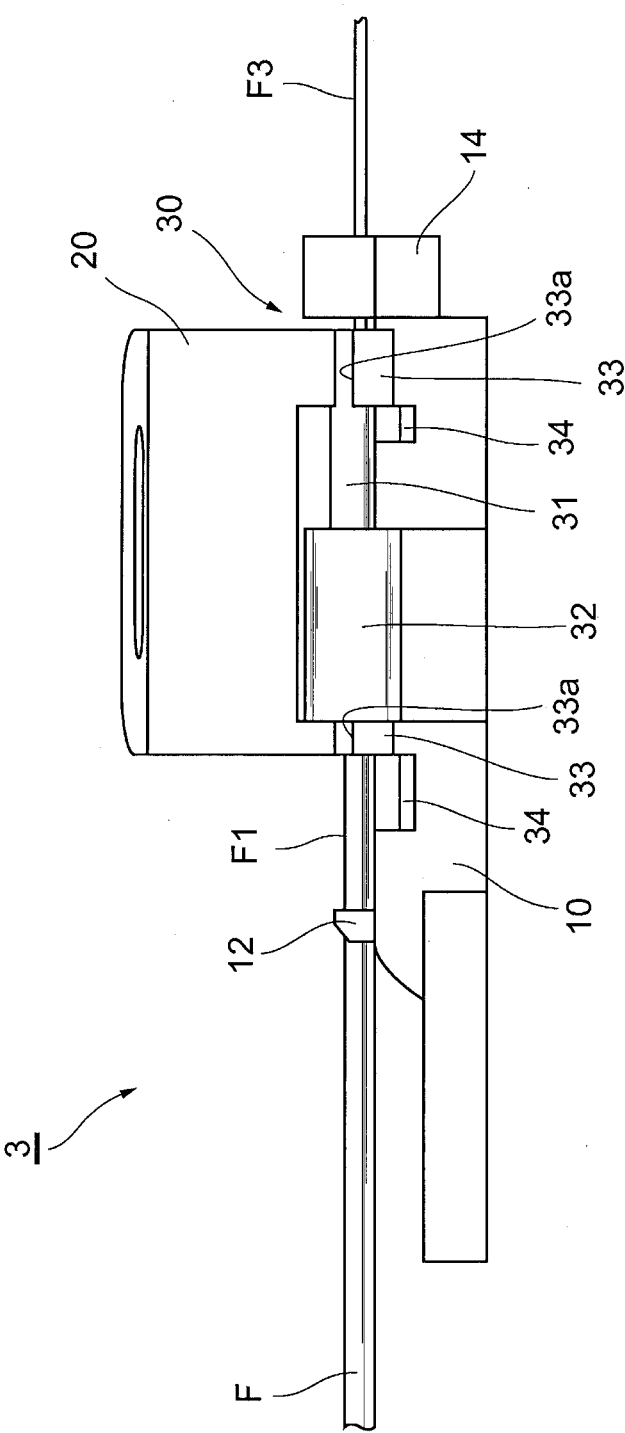
FIG. 4 is a side view of the optical fiber holder included in the optical fiber fusion splicer illustrated in FIG. 1 while the optical fiber holder is in the closed state.

FIG. 2 is a perspective view of one of the optical fiber holders 3 of the optical fiber fusion splicer 1 while the optical fiber holder 3 is in an open state. FIG. 3 is a perspective view of the optical fiber holder 3 while the optical fiber holder 3 is in a closed state. FIG. 4 is a side view of the optical fiber holder 3 while the optical fiber holder 3 is in the closed state. Each optical fiber holder 3 includes a base 10, a cover 20, and a connecting portion 30.

The base 10 includes a setting table 11 on which an optical fiber F is placed. A pair of guiding portions 12, multiple (two, here) pairs of guide pieces 13*a* and 13*b*, and a pair of guiding portions 14 are disposed on the setting table 11. The guiding portions 12 guide a tube portion F1 of the optical fiber F. The multiple pairs of guide pieces 13*a* and 13*b* allow a distal end portion of the tube portion F1 to be positioned thereon and guide an optical-fiber strand F2 protruding from the distal end portion. The guiding portions 14 guide a bare fiber F3 protruding from a distal end portion of the optical-fiber strand F2.

The pair of guiding portions 12, the pairs of guide pieces 13*a* and 13*b*, and the pair of guiding portions 14 are arranged in order in the longitudinal direction (predetermined direction) of the base 10. Thus, the optical fiber F is placed on the setting table 11 so as to be oriented in the longitudinal direction of the base 10 with the support of the guiding portions 12, the guide pieces 13*a* and 13*b*, and the guiding portions 14.

Two grooves 15 that extend substantially parallel to each other in the longitudinal direction of the base 10 are formed in the setting table 11. The grooves 15 are located on both sides of a center portion of the setting table 11 on which the optical fiber F is placed. A cuboid magnet 16 is disposed in each groove 15.

As described below, the cover 20 is openably and closeably joined to the base 10 via a connecting portion 30. Consequently, the cover 20 can be switched to a state of having been opened away from the base 10 as illustrated in FIG. 2 or closed over the base 10 as illustrated in FIG. 3.

Two metal plates 21 that extend in the longitudinal direction of the base 10 are attached to the cover 20. The metal plates 21 are located at positions corresponding to the respective magnets 16 when the cover 20 is in a state of having been closed over the base 10. Thus, the cover 20 can be kept in the state of having been closed over the base 10 due to the magnetic force generated between the magnets 16 and the metal plates 21.

A groove 22 that extends in the longitudinal direction of the base 10 is formed in the center portion of the cover 20 so as to keep the metal plates 21 separated from each other. The groove 22 is formed at a position corresponding to the position of the optical fiber F that is placed on the setting table 11 of the base 10 when the cover 20 is in the state of having been closed over the base 10.

Pressing members 23*a* to 23*c* that press the optical fiber F against the setting table 11 are disposed in the groove 22. The pressing members 23*a* to 23*c* are urged by elastic bodies (not illustrated), such as springs, toward a back face (a face that faces the base 10) 20*a* of the cover 20. Thus, when the cover 20 is in the state of having been closed over the base 10, the pressing members 23*a* to 23*c* press the optical fiber F placed on the setting table 11 against the setting table 11 by the urging force of the elastic bodies.

The pressing member 23*a*, the pressing member 23*b*, and the pressing member 23*c* are arranged in this order in the longitudinal direction of the base 10 and are separated from each other on at least a side near the back face 20*a* of the cover 20. A gap portion P1 between the pressing member 23*a* and the pressing member 23*b* is formed at such a position as to allow the guide pieces 13*a* to be inserted thereinto when the cover 20 is closed over the base 10. A gap portion P2 between the pressing member 23*b* and the pressing member 23*c* is formed at such a position as to allow the guide pieces 13*a* or the guide pieces 13*b* to be inserted thereinto when the cover 20 is closed over the base 10.

The pressing member 23*a*, the pressing member 23*b*, and the pressing member 23*c* separately press the optical fiber F when the cover 20 is closed over the base 10. Therefore, the pressing member 23*b* and the pressing member 23*c* can press the relatively thin optical-fiber strand F2 of the optical fiber F while the pressing member 23*a* presses the relatively thick tube portion F1.

The connecting portion 30 includes a rotating shaft 31, a tube-shaped portion 32, and shaft holders 33. The rotating shaft 31 is disposed on one side portion of the base 10 so as to extend in the longitudinal direction of the base 10. The tube-shaped portion 32 is formed so as to protrude from the one side portion of the base 10. The shaft holders 33 are formed so as to protrude from end portions of the cover 20 located on the base 10 side. The rotating shaft 31 is slidably inserted into the tube-shaped portion 32. The shaft holders 33 hold and secure the both end portions of the rotating shaft 31 inserted into the tube-shaped portion 32. In this manner, the connecting portion 30 joins the cover 20 to the base 10 so that the cover 20 is rotatable (openable and closeable) around the rotating shaft 31.

Here, the connecting portion 30 joins the cover 20 to the base 10 such that cover 20 is movable in the longitudinal direction of the base 10 with respect to the base 10 by making the rotating shaft 31 slidable with respect to the tube-shaped portion 32. Particularly, the connecting portion 30 allows the cover 20 to move with respect to the base 10 in the longitudinal direction of the base 10 only when the cover 20 is in the state of having been opened away from the base 10 such that the back face 20*a* of the cover 20 has become substantially parallel to the setting table 11 (that is, such that an angle included between the back face 20*a* and the setting table 11 has become substantially 180°).

To this end, the connecting portion 30 includes a pair of protrusions 34 formed so as to protrude from the one side portion of the base 10. Each shaft holder 33 is shaped like a tube having a notch 33*a*. The notch 33*a* is formed at such a position and in such a shape that the corresponding protrusion can pass therethrough when the cover 20 is opened away from the base 10 such that the back face 20*a* of the cover 20 becomes substantially parallel to the setting table 11. Thus, the cover 20 becomes movable with respect to the base 10 in the longitudinal direction of the base 10 only when the cover 20 is in the state of having been opened away from the base 10 such that the back face 20a of the cover 20 has become substantially parallel to the setting table 11. Consequently, the cover can be prevented from being accidentally moved in the predetermined direction in the course of being opened and closed.

When the optical fiber F is to be held by the optical fiber holder 3, first, as illustrated in FIG. 2, the optical fiber F is placed on the setting table 11 of the base 10. Here, the optical fiber F is placed so as to be oriented in the longitudinal direction of the base 10 with the support of the guiding portions 12, the guide pieces 13a and 13b, and the guiding portions 14.

Subsequently, while the cover 20 is in the state of having been opened away from the base 10 such that the back face 20a of the cover 20 has become substantially parallel to the setting table 11, the position of the cover 20 in the longitudinal direction of the base 10 is adjusted. More specifically, the position of the cover in the longitudinal direction of the base 10 is adjusted so that the positions of the pressing members 23a to 23c are adjusted in accordance with the ratio of the exposed bare fiber F3 to the exposed optical fiber strand F2.

Figure 5:
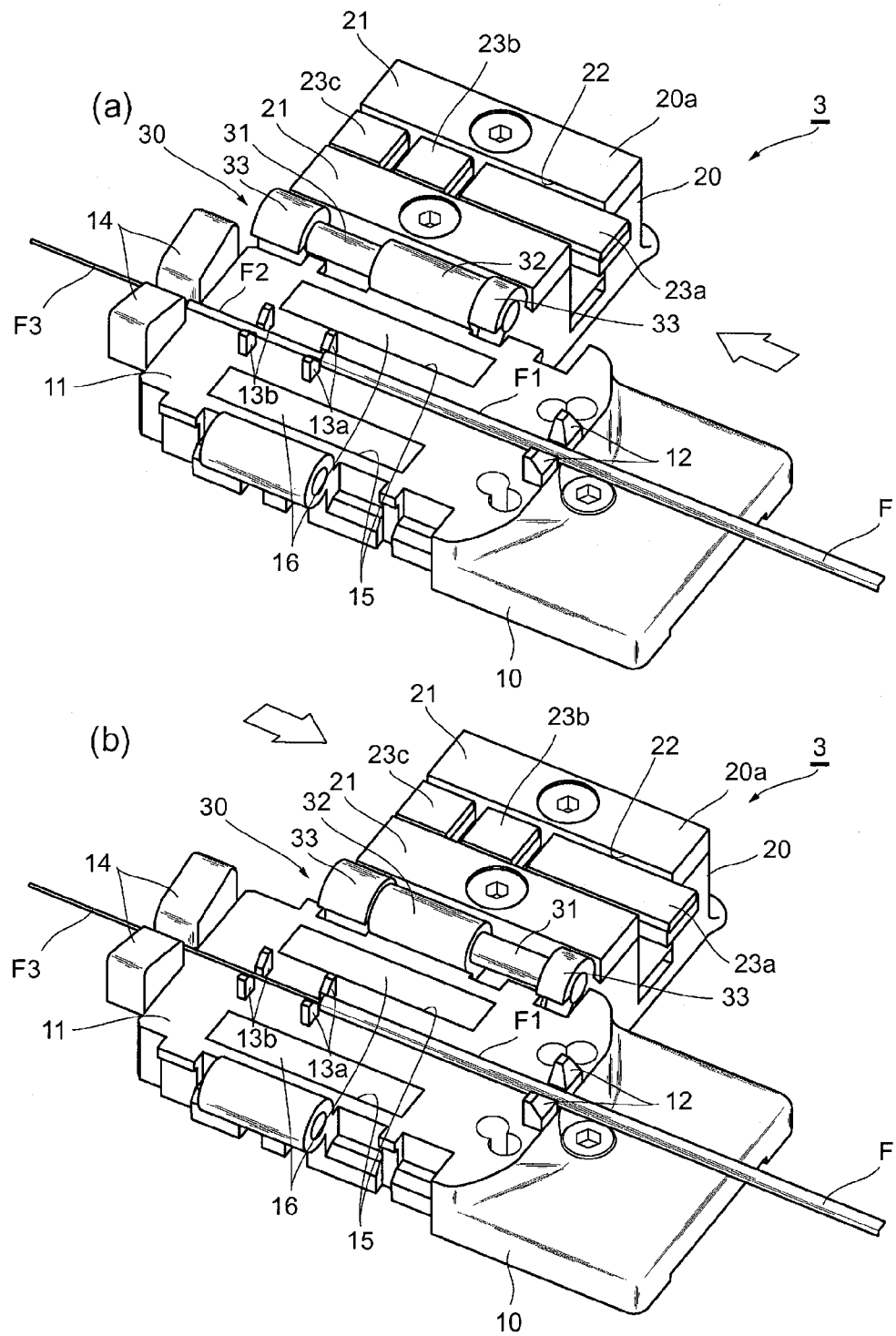
FIG. 5 is a schematic diagram illustrating how the position of a cover of the optical fiber holder is adjusted.

For example, when the optical fiber F is a loose buffer optical fiber, the ratio of the exposed bare fiber F3 to the exposed optical fiber strand F2 is relatively small. In other words, when the optical fiber F is a loose buffer optical fiber, the optical-fiber strand F2 is relatively long. Therefore, in order to press the optical-fiber strand F2 by using the pressing member 23b and the pressing member 23c, the cover 20 is moved toward an end (a front end) of the base 10 as illustrated in FIG. 5(a).

On the other hand, when the optical fiber F is a tight buffer optical fiber, the ratio of the exposed bare fiber F3 to the exposed optical fiber strand F2 is relatively large. In other words, when the optical fiber F is a tight buffer optical fiber, an optical-fiber strand F2 is short. Therefore, in order to press the tube portion F1 by using the pressing member 23a and the pressing member 23b, the cover 20 is moved toward a rear end of the base 10 as illustrated in FIG. 5(b).

When the cover 20 is then switched to the state of having been closed over the base 10 as illustrated in FIG. 3, the pressing members 23a to 23c press the optical fiber F against the setting table 11 to hold the optical fiber F.

As described above, in the optical fiber holder 3, the connecting portion 30 joins the cover 20 to the base 10 such that the cover 20 is movable with respect to the base 10 in the longitudinal direction of the base 10. Consequently, the pressing members 23a to 23c that press the optical fiber F are movable in the longitudinal direction of the base 10.

Thus, by moving the pressing members 23a to 23c in accordance with the ratio of the exposed bare fiber F3 to the exposed optical fiber strand F2 (that is, in accordance with the length of the optical-fiber strand F2), the optical fiber F can be held without the bare fiber F3 being directly pressed. Consequently, even when optical fibers having different ratios of the exposed bare fiber F3 to the exposed optical fiber strand F2, such as a loose buffer optical fiber and a tight buffer optical fiber, are held, the bare fibers can be prevented from being damaged. Moreover, since the optical fiber fusion splicer 1 includes the above-described optical fiber holder 3, the optical fiber fusion splicer 1 can excellently fusion-splices the optical fibers together while the bare fibers are prevented from being damaged.

Thus far, the optical fiber holder and the optical fiber fusion splicer according to the embodiment of the present invention have been described. However, the optical fiber holder and the optical fiber fusion splicer according to the present invention are not limited to the optical fiber holder 3 and the optical fiber fusion splicer 1 described above. The optical fiber holder and the optical fiber fusion splicer according to the present invention may be ones obtained by modifying the optical fiber holder 3 and the optical fiber fusion splicer 1 within the scope not changing the gist of the claims. For example, in the above embodiment, the optical fiber holder 3 has been described as being installed in the optical fiber fusion splicer 1, but the present invention is not limited to this. The optical fiber holder 3 may be installed in other devices.

CITATION LIST

Patent Literature

PTL 1: Japanese Patent Application Publication No. 2008-292523

The invention claimed is:

1. An optical fiber holder that holds an optical fiber, the optical fiber holder comprising:
 a base including a setting table on which the optical fiber is placed so as to be oriented in a predetermined direction and a protrusion protruding from the base;
 a cover including a pressing member that presses the optical fiber placed on the setting table against the setting table; and
 a connecting portion that joins the base and the cover together,
 wherein the connecting portion joins the cover to the base such that the cover is openable away from and closeable over the base and, the protrusion, the connecting portion and the cover are configured such that the cover is movable relative to the base in the predetermined direction only when the cover is in an open state having been opened away from the base.

2. The optical fiber holder according to claim 1, wherein the cover is movable in the predetermined direction only when the cover is in the open state having been opened away from the base such that a back face of the cover has become substantially parallel to the setting table.

3. The optical fiber holder according to claim 1, wherein the base includes a plurality of guides protruding from the setting table, the guides allowing the optical fiber to be positioned thereon so as to be oriented in the predetermined direction.

4. The optical fiber holder according to claim 2, wherein the connecting portion includes a rotating shaft disposed parallel to the predetermined direction, a tube-shaped portion integrated with the base and into which the rotating shaft is inserted, a shaft holder integrated with the cover and holding the rotating shaft, and all the protrusion protruding from the base, and wherein the shaft holder has a notch so as not to interfere with the protrusion when the cover is in the open state having been opened away from the base such that the back face of the cover has become substantially parallel to the setting table.

5. An optical fiber fusion splicer comprising:
 of optical fiber holders each according to claim 1, the optical fiber holders being disposed so as to face each other; and a splicing portion that splices the optical fibers held by the optical fiber holders together.

6. The optical fiber holder according to claim 1, wherein the connecting portion includes a rotating shaft that joins the cover to the base such that the cover pivots about the rotating shaft relative to the base, and the cover is movable relative to the base in the predetermined direction.

7. An optical fiber holder that holds an optical fiber, the optical fiber holder comprising:
   a base including a setting table on which the optical fiber is placed so as to be oriented in a predetermined direction;
   a cover including a pressing member that presses the optical fiber placed on the setting table against the setting table; and
   a connecting portion that joins the base and the cover together,
   wherein the connecting portion joins the cover to the base such that the cover is openable away from and closeable over the base and movable in the predetermined direction, and the cover is movable in the predetermined direction only when the cover is in a state of having been opened away from the base such that a back face of the cover has become substantially parallel to the setting table.

8. An optical fiber holder that holds an optical fiber, the optical fiber holder comprising:
   a base including a setting table on which the optical fiber is placed so as to be oriented in a predetermined direction;
   a cover including a pressing member that presses the optical fiber placed on the setting table against the setting table; and
   a connecting portion that joins the base and the cover together, the connecting portion including a rotating shaft disposed parallel to the predetermined direction, a tube-shaped portion integrated with the base and into which the rotating shaft is inserted, a shaft holder integrated with the cover and holding the rotating shaft, and a protrusion protruding from the base,
   wherein the connecting portion joins the cover to the base such that the cover is openable away from and closeable over the base and movable in the predetermined direction, and wherein the shaft holder has a notch so as not to interfere with the protrusion when the cover is in the state of having been opened away from the base such that the back face of the cover has become substantially parallel to the setting table.

\* \* \* \* \*